(12) United States Patent
Holland et al.

(10) Patent No.: US 7,610,418 B2
(45) Date of Patent: Oct. 27, 2009

(54) MAXIMIZING BLADE SLOT UTILIZATION IN A STORAGE BLADE ENCLOSURE

(75) Inventors: William Gavin Holland, Cary, NC (US); Shah Mohammad Rezaul Islam, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 11/466,690

(22) Filed: Aug. 23, 2006

(65) Prior Publication Data

US 2008/0126582 A1    May 29, 2008

(51) Int. Cl.
   *G06F 13/12* (2006.01)
   *G06F 3/00* (2006.01)
(52) U.S. Cl. .............................. 710/62; 710/8; 710/63; 710/72
(58) Field of Classification Search .................. None
   See application file for complete search history.

(56) References Cited

U.S. PATENT DOCUMENTS

| | | | |
|---|---|---|---|
| 6,392,884 B1 * | 5/2002 | Chou ........................ 361/687 |
| 6,446,141 B1 | 9/2002 | Nolan et al. |
| 6,661,671 B1 * | 12/2003 | Franke et al. ............... 361/752 |
| 7,155,546 B2 * | 12/2006 | Seto ........................... 710/100 |
| 2003/0033366 A1 | 2/2003 | Garnett et al. |
| 2004/0145879 A1 * | 7/2004 | Hensley et al. .............. 361/788 |
| 2004/0236556 A1 | 11/2004 | Lin |
| 2005/0125575 A1 | 6/2005 | Alappat et al. |
| 2005/0198408 A1 * | 9/2005 | Watanabe et al. ............. 710/18 |
| 2005/0223171 A1 | 10/2005 | Kanai |
| 2006/0074927 A1 * | 4/2006 | Sullivan et al. ............. 707/100 |
| 2007/0047536 A1 * | 3/2007 | Scherer et al. .............. 370/360 |

* cited by examiner

*Primary Examiner*—Alan Chen
(74) *Attorney, Agent, or Firm*—Dan Shifrin

(57) ABSTRACT

A method of configuring a blade enclosure is provided in which, in a first step, slots are identified whose SAS connectors are to be connected to SAS device blades in a minimum capacity configuration. In a second step, slots are identified whose SAS connectors are to be connected to the SAS device blades in a maximum capacity configuration. A path is then established from the SAS switch to the SAS connector of each slot identified in either the first step or the second step. Blade devices, such as RAID controller blades and disk enclosure blades are installed in the identified slots. Thus, the SAS switch within the enclosure selectively and efficiently interfaces with a predetermined number of blade slots rather than with all slots.

16 Claims, 4 Drawing Sheets

MAXIMIZING BLADE SLOT UTILIZATION IN A STORAGE BLADE ENCLOSURE

TECHNICAL FIELD

The present invention relates generally to blade enclosures and, more particularly, to configuring a blade enclosure for more efficient use of blade slots.

BACKGROUND ART

Blade systems have become very popular due in part to their high density of computing, control and/or storage capacity, the variety of the blade modules which can be accommodated and the ease with which blade modules may be installed or replaced. For example, the BladeCenter® system from IBM® has a chassis with power supplies, cooling and fourteen slots for various combinations of blade devices, including servers, hard drives and RAID and other storage controllers. Additionally, the chassis includes bays into which fibre channel (FC) and serial attached SCSI (SAS) switches may be installed. Each slot and switch bay includes connectors for both FC and SAS blade devices. Similarly, the switch includes both FC and SAS interconnections. The FC and SAS slot and switch connectors are typically provided in redundant pairs but for clarity will be referred to and illustrated herein as single connectors.

In one blade implementation (FIG. 1), a blade enclosure 100 houses one or more FC and/or SAS switches 102 and a number of server blades 104. External storage 106 in the form of "just a bunch of disks" (JBOD) or a "switched bunch of disks" (SBOD) in a storage area network (SAN) is connected to the switch 102 through a pair of external redundant RAID controllers 108A, 108B. For greater efficiency and convenience, a more recent blade implantation (FIG. 2) includes the entire SAN within a blade enclosure 200 on one chassis: FC and SAS switches 202, server blades 204A, 204B, disk drive blades 206A, 206B, and dual (redundant) RAID controller blades 208A, 208B.

Each blade slot is comprised of one port for each FC and SAS connector. Each FC port consists of a single physical layer ("PHY") while each SAS port can be defined to be (or have associated with it) one or more PHYs, such as 4, 8 or 16. A PHY is the portion of a network device in which data is encoded (or decoded) and transmitted (or received) to another device on the network. Multi-PHY ports are designed for the increased bandwidth and speed of newer, "wider" SAS fabrics and some newer blades require more than one slot. However, current switches (also known as expanders), which support 14 slots, have 12, 24 or 36 PHYS. A 36-PHY switch can thus accommodate only 36/4=9 4-PHY (4X) blades. Put another way, 14 4X blades require 56 SAS PHYS and would need to be handled by three 36 PHY switches for full any-to-any connectivity, two switches, each using seven ports (28 PHYS) for blades and the remaining ports (8 PHYs) with which to connect to a third switch for multiplexing. Such a complicated configuration runs counter to the desire to reduce the number of components as well as reduce cost, power and space requirements. Moreover, it is expected that future BladeCenters will implement more and wider fabrics (that is, greater than 4X) thereby exacerbating the problem.

Consequently, a need remains for a fully contained blade system with wide fabrics and multi-slot blades but which can be implemented with a single SAS 36-PHY switch.

SUMMARY OF THE INVENTION

The present invention provides a blade enclosure having a plurality of blade slots and an SAS switch. Each slot includes a fibre channel (FC) connector to which an FC device blade is connectable and an SAS connector to which an SAS device blade is connectable. The SAS switch includes a plurality of SAS ports equal to the plurality of blade slots, each SAS port having a plurality of PHYs. The SAS switch further includes a selected path to each of a selected plurality of SAS connectors, the plurality of selected paths being less than the plurality of blade slots. The paths are selected whereby a multi-slot drive enclosure blade is connectable to the SAS switch through only one of the selected paths and a single-slot controller blade is connectable to the SAS switch through one of the selected paths.

A method of configuring a blade enclosure is also provided by the present invention in which, in a first step, slots are identified to whose SAS connectors SAS device blades are to be connected in a minimum capacity configuration. In a second step, slots are identified to whose SAS connectors SAS device blades are to be connected in a maximum capacity configuration. A path is then established from the SAS switch to the SAS connector of each slot identified in either the first step or the second step. A computer program product having computer-readable code embodied therein for configuring a blade enclosure are also provided by the present invention.

Blade devices, such as RAID controller blades and disk enclosure blades are installed in the identified slots. Thus, the SAS switch within the enclosure selectively and efficiently interfaces with a predetermined number of blade slots rather than with all slots.

DETAILED DESCRIPTION OF THE PREFERRED EMBODIMENT

Figure 1:
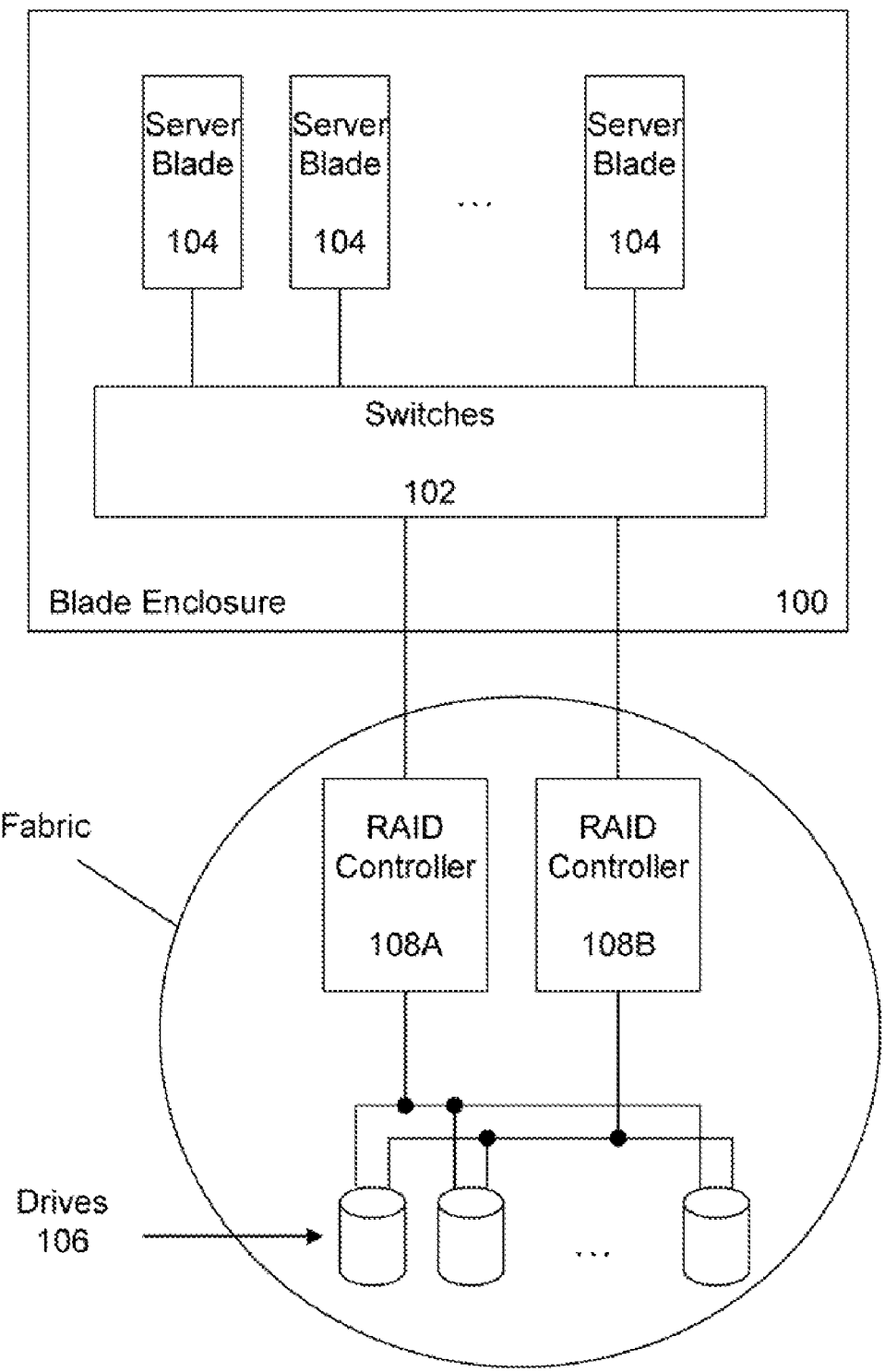
FIG. 1 is a block diagram of a prior art blade system with an external storage fabric.
Figure 2:
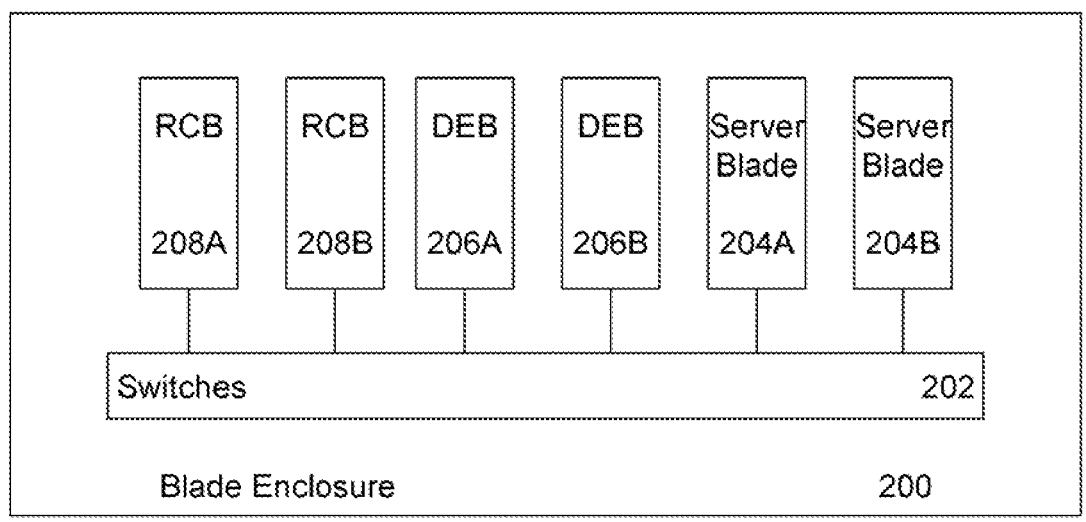
FIG. 2 is a block diagram of another prior art blade system in which servers, controllers and storage are installed within the blade enclosure.
Figure 3A:
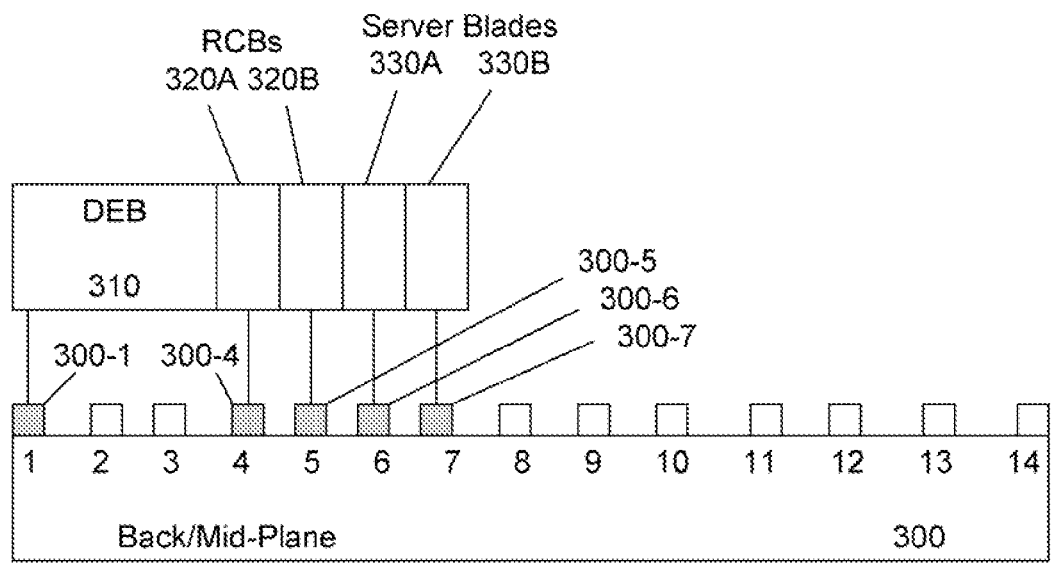
FIG. 3A illustrates the slots of a blade enclosure of the present invention in which blade devices may be installed in a minimum configuration.

The present invention provides an efficient use of blade slots by defining maximum and minimum blade configurations and establishing paths from the SAS switch to selected, predetermined blade slots rather than to all slots, thereby reducing the number of PHYs required. In accordance with the present invention, a minimum configuration of blade devices is determined. In FIG. 3A, for example, a minimum configuration includes one three-slot four-PHY disk enclosure blade (DEB) 310 which can house up to 24 hard disk drives, in slots 1-3. However, the DEB 310 is connectable to a 14-slot backplane or midplane 300 and hence to an SAS switch through only one pair of redundant SAS connectors (represented by a single connector) 300-1, A redundant pair of single-slot, single-PHY RAID controller blades (RCBs) 320A, 320B installed in slots 4 and 5, respectively, are connectable to SAS connectors 300-4, 300-5 and a pair of server blades 330A, 330B installed in slots 6 and 7, respectively, are connectable to FC connectors 300-6, 300-7. Although the blade devices may be installed in any available slot or set of slots, slots 1-7 are preferably used in the minimum configuration in order to minimize the number of power supplies needed, which is typically one pair of redundant power supplies for devices in any of the first seven slots and another pair for devices in any of the second seven slots. In the illustrated minimum configuration, while slots 1-7 are occupied, only SAS connectors 300-1, 300-4, 300-5 in slots 1, 4 and 5 are used.

Figure 3B:
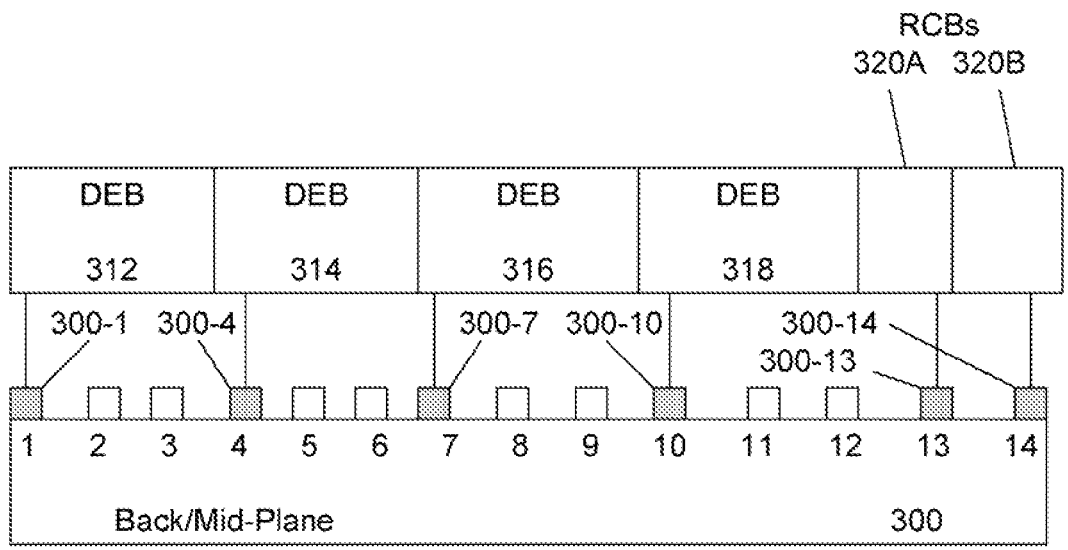
FIG. 3B illustrates the slots of a blade enclosure of the present invention in which blade devices may be installed in a maximum configuration.

A maximum configuration of blade devices is also determined. In FIG. 3B, for example, a maximum configuration includes three three-slot, four-PHY DEBs 312, 314, 316, 318 in slots 1-3, 4-6, 7-9 and 10-12. Each DEB 310, 312, 314, 316, 318 is connectable to the backplane or midplane 300 and thence to the SAS switch through only one pair of redundant SAS connectors 300-1, 300-4, 300-7, 300-10, respectively. The redundant pair of single-slot, single-PHY RCBs 320A, 320B installed in slots 13 and 14, respectively, are connectable to SAS connectors 300-13, 300-14. The maximum configuration of FIG. 38 does not include server blades 330A, 330B within the housing. Rather, the server blades 330A, 330B may be housed in a separate enclosure and connected through an FC link as in FIG. 4. In the illustrated minimum configuration, while all 14 slots are occupied, only SAS connectors 300-1, 300-4, 300-7, 300-10, 300-13 and 300-14 in sots 1, 4, 7, 10, 13 and 14 are used.

Figure 4:
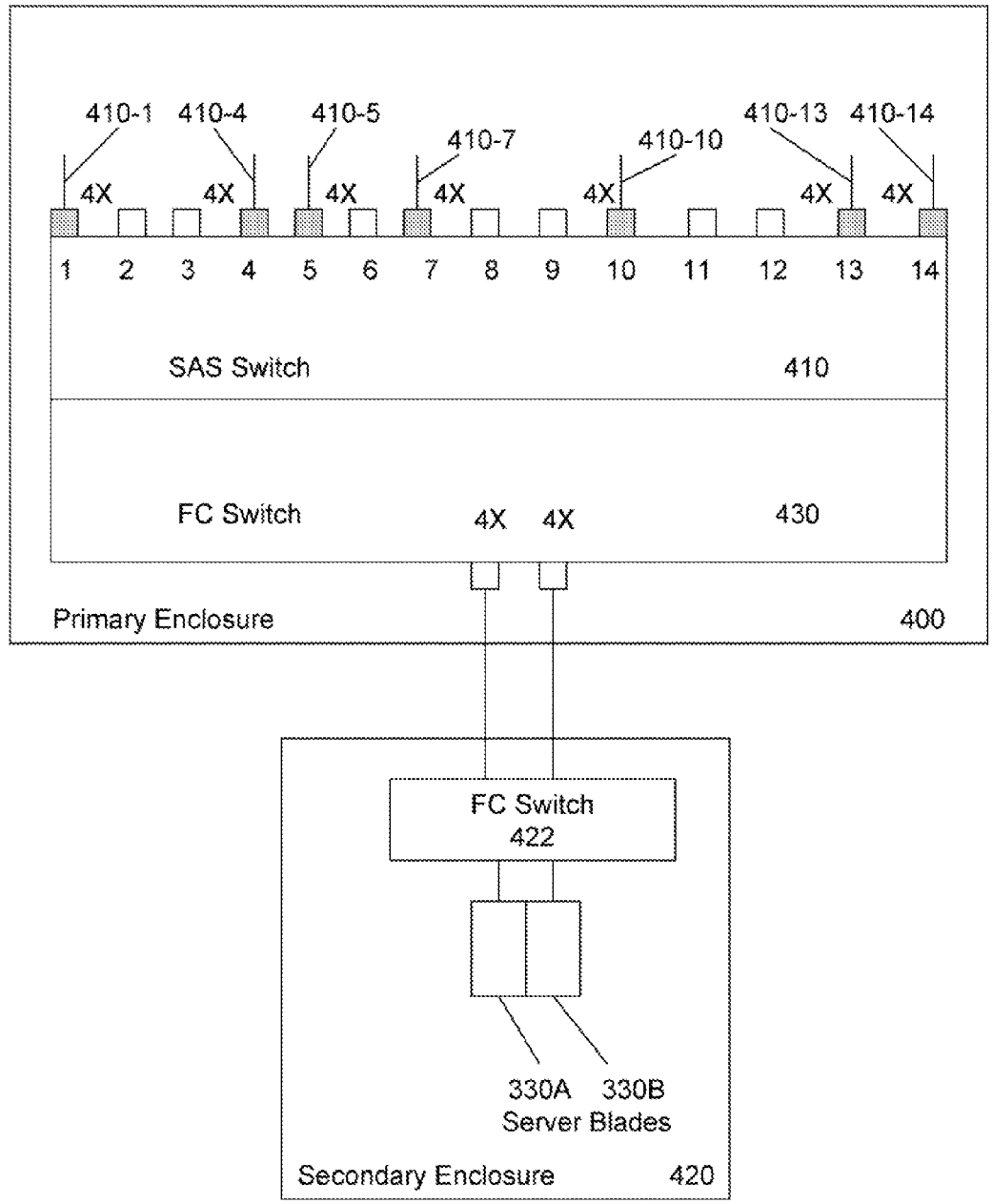
FIG. 4 illustrates the blade slots with which the SAS switch interfaces with in the present invention.

FIG. 4 illustrates a switch 410 configured to establish paths 410-1, 410-4, 410-5, 410-7, 410-10, 410-13 and 410-14 to the SAS connectors to each of the slots in which an SAS device may be installed in any configuration of the minimum (FIG. 3A) or the maximum (FIG. 3B). These seven slots, 1, 4, 5, 7, 10, 13 and 14 represent a superset of the slots 1, 4 and 5 determined from the minimum configuration and slots 1, 4, 7, 10, 13 and 14 identified from the maximum configuration. In effect, the two sets may be logically OR'd to identify the slots to which paths are to be established. With these paths established, a pair each of RCBs and server blades and from one to three DEBs may be installed in a primary blade enclosure 400. Four DEBs may be accommodated in the maximum configuration by moving the pair of server blades 330A, 330B (which do not require SAS connectors) to another, secondary enclosure 420. The secondary enclosure 420 is coupled to the primary enclosure 400 through cabling from an EC switch 422 to an FC switch 430 in the primary enclosure 400. Thus, 4X devices installed in the seven established paths require, at most, 7×4X=28 PHYs in the SAS switch 410. The remaining eight PHYs may be used with two 4X ports with which external storage may be interfaced. The total, 36 PHYs require only a single SAS switch thereby minimizing the cost, footprint and power requirements of the system.

It will be appreciated that the present invention may be implemented with enclosures having greater or fewer slots than fourteen and with a number of PHYs per port other than 4.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of recordable media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for configuring a blade enclosure.

What is claimed is:

1. A blade enclosure, comprising:
    a plurality of blade slots, each blade slot including:
        a fibre channel (FC) connector to which an FC device blade is connectable; and
        a serial attached SCSI (SAS) connector to which an SAS device blade is connectable; and
    an SAS switch, comprising:
        a plurality of SAS ports equal to the plurality of blade slots, each SAS port comprising a plurality of physical layers (PHYs);
        a selected path to each of a selected plurality of the SAS connectors, the selected plurality of paths being less than the plurality of blade slots, the paths being selected whereby:
            a multi-slot drive enclosure blade is connectable to the SAS switch through only one of the selected paths; and
            a single-slot controller blade is connectable to the SAS switch through one of the selected paths.

2. The enclosure of claim 1, wherein:
    the FC device blade is selected from the group comprising a server blade and a controller blade; and
    the SAS device blade is selected from the group comprising a drive enclosure storage blade and a controller blade.

3. The enclosure of claim 1, wherein the selected plurality of SAS connectors are selected by:
    identifying the blade slots in which SAS devices are to be connected in a minimum configuration;
    identifying the blade slots in which SAS devices are to be connected in a maximum configuration; and
    performing a logical OR to identify the blade slots to which paths from the SAS switch are selected.

4. The enclosure of claim 3, wherein:
    the plurality of blade slots equals fourteen;
    the plurality of paths equals seven; and
    the number of PHYs associated with each SAS port equals four.

5. The enclosure of claim 4, wherein:
    a multi-slot drive enclosure blade requires three slots;
    the minimum configuration comprises:
        a drive enclosure blade in slots 1-3; and
        a controller blade in each of slots 4 and 5;
    the maximum configuration comprises:
        a drive enclosure blade in each of slots 1-3, 4-6, 7-9 and 10-12; and
        a controller blade in each of slots 13 and 14; and the slots to which paths from the SAS switch are selected are 1, 4, 5, 7, 10, 13 and 14.

6. The enclosure of claim 1, further comprising an FC interface to which another enclosure, housing one or more blade servers, is connectable through a second FC switch and integrated into an FC fabric.

7. A method of configuring a blade enclosure, the blade enclosure having a serial attached SCSI (SAS) switch and a plurality of blade slots, each slot including a fibre channel (FC) connector to which an FC device blade is connectable and an SAS connector to which an SAS device blade is connectable, the method comprising:
  in a first step, identifying the blade slots whose SAS connectors are to be connected to SAS device blades in a minimum capacity configuration;
  in a second step, identifying the blade slots whose SAS connectors are to be connected to the SAS device blades in a maximum capacity configuration; and
  establishing a path from the SAS switch to the SAS connector of each blade slot identified in either the first step or the second step.

8. The method of claim 7, wherein:
  the minimum capacity configuration includes one multi-slot drive enclosure blade and a pair of redundant single-slot controller blades; and
  the maximum capacity configuration includes a plurality of multi-slot drive enclosure blades and a pair of redundant single-slot controller blades.

9. The method of claim 8, wherein the minimum and the maximum capacity configuration further includes no server blades.

10. The method of claim 9, further comprising, in the maximum capacity configuration, coupling a pair of redundant blade servers, housed in a separate blade enclosure, to the SAS switch.

11. The method of claim 7, wherein:
  the plurality of blade slots equals fourteen;
  a multi-slot drive enclosure blade requires three blade slots and connects to one SAS connector;
  a single-slot controller blade requires one blade slot and connects to one SAS connector;
  the minimum configuration comprises:
    a drive enclosure blade in blade slots 1-3; and
    a controller blade in each of blade slots 4 and 5;
  the maximum configuration comprises:
    a drive enclosure blade in each of blade slots 1-3, 4-6, 7-9 and 10-12; and
    a controller blade in each of blade slots 13 and 14; and
  establishing the path comprises establishing a path from the SAS switch to the SAS connectors in each of blade slots 1, 4, 5, 7, 10, 13 and 14.

12. A computer program product being a computer readable storage medium usable with a programmable computer, the computer program product having computer-readable code embodied therein for configuring a blade enclosure, the blade enclosure having a serial attached SCSI (SAS) switch and a plurality of blade slots, each blade slot including a fibre channel (FC) connector to which an FC device blade is connectable and an SAS connector to which an SAS device blade is connectable, the computer-readable code comprising instructions for:
  in a first step, identifying the blade slots whose SAS connectors are to be connected to SAS device blades in a minimum capacity configuration;
  in a second step, identifying the blade slots whose SAS connectors are to be connected to the SAS device blades in a maximum capacity configuration; and
  establishing a path from the SAS switch to the SAS connector of each blade slot identified in either the first step or the second step.

13. The computer program product of claim 12, wherein:
  the minimum capacity configuration includes one multi-slot drive enclosure blade and a pair of redundant single-slot controller blades; and
  the maximum capacity configuration includes a plurality of multi-slot drive enclosure blades and a pair of redundant single-slot controller blades.

14. The computer program product of claim 13, wherein the minimum and the maximum capacity configuration further includes no server blades.

15. The computer program product of claim 14, the computer-readable code further comprising instructions for, in the maximum capacity configuration, coupling a pair of redundant blade servers, housed in a separate blade enclosure, to the SAS switch.

16. The computer program product of claim 12, wherein:
  the plurality of blade slots equals fourteen;
  a multi-slot drive enclosure blade requires three blade slots and connects to one SAS connector;
  a single-slot controller blade requires one blade slot and connects to one SAS connector;
  the minimum configuration comprises:
    a drive enclosure blade in blade slots 1-3; and
    a controller blade in each of blade slots 4 and 5;
  the maximum configuration comprises:
    a drive enclosure blade in each of blade slots 1-3, 4-6, 7-9 and 10-12; and
    a controller blade in each of slots 13 and 14; and
  the computer-readable code further comprising instructions for establishing the path comprises establishing a path from the SAS switch to each of the SAS connectors in slots 1, 4, 5, 7, 10, 13 and 14.

* * * * *

UNITED STATES PATENT AND TRADEMARK OFFICE
CERTIFICATE OF CORRECTION

PATENT NO. : 7,610,418 B2  Page 1 of 1
APPLICATION NO. : 11/466690
DATED : October 27, 2009
INVENTOR(S) : Holland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 252 days.

Signed and Sealed this

Twelfth Day of October, 2010

David J. Kappos
*Director of the United States Patent and Trademark Office*